Oct. 21, 1924.
H. B. KIPPER
PROCESS OF SPEEDING CHEMICAL REACTIONS
Filed June 23, 1921
1,512,225
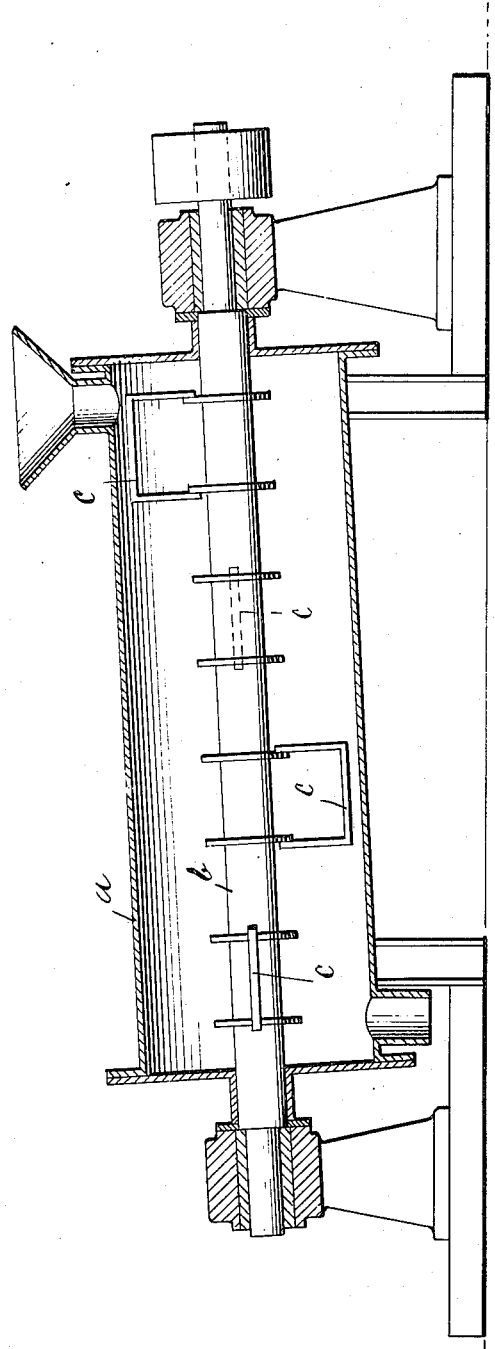

Patented Oct. 21, 1924.

UNITED STATES PATENT OFFICE.

HERMAN B. KIPPER, OF MUSKEGON, MICHIGAN.

PROCESS OF SPEEDING CHEMICAL REACTIONS.

Application filed June 23, 1921. Serial No. 479,799.

*To all whom it may concern:*

Be it known that I, HERMAN B. KIPPER, a citizen of the United States of America, and a resident of Muskegon, county of Muskegon, and State of Michigan, have invented certain new and useful Improvements in Processes of Speeding Chemical Reactions, of which the following is a specification.

This application is a continuation in part of the application Serial No. 349,288, filed January 3, 1920, which has matured into Patent 1,435,928 November 21, 1922.

The present invention relates to a process of speeding chemical reactions accelerated by the use of catalytic or intermediary substances.

A considerable number of chemical reactions, which hitherto have been regarded merely as chemically interesting, may be commercially utilized by greatly increasing the speed of these reactions.

I have found that if both the catalytic agents and the reaction materials are kept in rapid motion by the step of mixing and grinding during the reaction period that the speed of reaction is tremendously increased.

A great difference is brought about in the speeds of chemical reaction by the step of merely mixing during the period of reaction as compared with the step of grinding and mixing during the same period.

The differences will become more apparent from the following analogy:

It is known that during the night the space surrounding us is not entirely devoid of light rays. There are birds who employ such light rays to guide themselves in their flight, and some vegetable life is affected by such light. On the other hand, the sunlight is productive of vegetable growth. Sunlight doubtless contains a higher percentage of ethereal particle wave motions that impinge upon the plant than the light rays invisible to man during the night.

Mixing alone produces results in the reactions in question, akin to the rays of light during the night upon the plant, but the step of mixing and grinding hastens these reactions just as sunlight hastens the growth of the plant. The step of mixing, of course, carries the material from the cold to the hotter zones of the furnace and thereby with many substances in their reactions with one another, no doubt, increases the speed of reaction. It is, however, the step of grinding during the reaction that absolutely establishes the value of my process. Materials of the nature of these which we are dealing with tend to aggregate at higher temperatures and when in the semi-fused state. Mixing tends only to increase such aggregation with consequent diminution in the speed of absorption or reaction. On the other hand, if the particles are prevented from aggregating by being separated and ground by hammer impacts, not only is the speed of reaction very greatly increased but the process brought nearer to completion in an apparatus of given capacity. Mixing alone does not increase the two above mentioned factors. In fact in reaction of nitrogen with such solids or semi-fused materials I have dealt with, the reaction may even be greatly retarded by mixing. I have found that in some cases the aggregation mentioned still occurs when the hammers, whereby the mixing is effected, are driven at a speed of half a mile per minute but that such aggregation is entirely eliminated at a speed of a mile a minute. It is upon these findings that the success of my invention rests.

Thus, for instance, ferric oxide is used as a catalytic agent to hasten the speed of combination between sulphur dioxide and oxygen to form sulphur trioxide at a temperature of 200° to 500° C. Again in the oxidation of ammonia to the oxides of nitrogen platinum is an especially efficient catalyst, altho many other substances have been found to hasten the speed of this oxidation process. in the well known Deacon process cupric chloride is used to increase the speed of reaction between the hydrochloric acid gas and oxygen or air at a temperature of 200° to 500° C. to form chlorine and steam. In the above enumerated reactions it will be noted, the reaction substances are gases, whereas the catalysts are solids, altho at the temperatures of reaction in some instances the tendency towards fusion of the latter may occur. Generally in utilizing such catalysts the latter are divided and spread over shredded asbestos or other inert carrier and held in a fixed or stationary state while the reaction gases are kept in a condition of motion around these substances. According to my process the catalysts as well as the reaction substances, are kept in a very rapid state of motion and at the same time prevented from fusion or agglomeration, whereby the speeds of reaction are tremendously accelerated over and above those produced by catalysts. In fact, the very rapid motions imparted to the reaction substances produce speeds of reaction in some instances approximating those produced by the catalysts. By using in conjunction with such catalytic agents, speeds of motion of the reaction substances as well as of the catalysts, remarkable super-imposed effects or speeds of reaction are obtained. These latter, in fact, occur hundreds of thousands of times as rapidly as they take place at the reaction temperatures without the aid of such mechanical and catalytic agencies. Altho in the class of reactions mentioned, the reaction substances were gases and the catalysts solids, I have found that similar super-imposed effects are produced when the substances are solids or liquids and the catalysts are liquids or gases. Thus aluminum chloride is used to extensively accelerate organic chemical reactions. For instance, in the acetylization of benzol by acetyl chloride, the reaction is greatly accelerated by the presence of anhydrous aluminum chloride. Similarly the oxides of nitrogen are used as catalysts in the broadest sense of the term, or to form intermediary compounds which are again decomposed in the manufacture of sulphuric acid by the so-called "lead chamber process." In these processes, as in those already enumerated, the very rapid rotation or agitation of the reaction substances as well as of the catalytic agents tremendously increases the reaction speeds. My new process may be carried out by an apparatus fully described in the co-pending application, Serial No. 433,561, and which is diagrammatically illustrated in the accompanying drawing. The apparatus consists of a cylinder or pipe $a$ through the center of which extends a rotary shaft $b$ on which are suitably mounted hammers $c$ by the impact of which both the mixing and grinding is effected. The reaction material is driven through the cylinder either directly by the hammers arranged helically around the shaft or otherwise suitably constructed or by arranging the cylinder and the revolving shaft in an inclined position. The hammers may be coated with an enamel, wire reinforced glass or other material resistant both to the actions of the catalysts and to the reaction materials and products.

Thus for the oxidation of ammonia to the oxides of nitrogen, I employ hammers whose ends carry a frame in which is inserted a net or web made from fine platinum wire.

In the oxidation of nitrogen to its oxides electrical energy is used, so to speak, to produce the reaction. In such process I have used the reaction cylinder as one electrode and the water cooled hammers as the other electrode.

What I claim and desire to secure by Letters Patent is:—

1. In chemical reactions accelerated by the use of catalytic agents, the step of keeping in rapid motion both these agents and the reaction materials during the progress of chemical reaction by means of rapidly rotating hammers.

2. In chemical reactions accelerated by the use of catalytic agents, the step of keeping in rapid motion both these agents and the reaction materials during the progress of chemical reaction by means of rapidly rotating hammers coated with material resistant to the actions of the reaction substances and catalytic agents.

3. In chemical reactions accelerated by the use of catalytic agents, the step of keeping in rapid motion both these agents and the reaction materials during the progress of chemical reaction by means of rapidly rotating hammers covered with wire reinforced glass.

4. In the chemical reaction occurring between hydrochloric acid gas and oxygen to form chlorine and water at temperatures of 200° to 500° C. and in the presence of cupric chloride, the step of keeping both the cupric chloride and the reaction materials in rapid motion during the process of chemical reaction.

5. In the chemical reaction occurring between hydrochloric acid gas and oxygen to form chlorine and water at temperatures of 200° to 500° C. and in the presence of cupric chloride, the step of keeping both the cupric chloride and the reaction materials in rapid motion by means of rapidly rotating metal hammers coated with a material resistant to the cupric chloride and reaction materials and products, at the temperatures of operation.

Signed at Muskegon, Mich., this 17th day of June, 1921.

HERMAN B. KIPPER.

Witnesses:
  A. N. MARS,
  THOS. E. WEST.